US012742437B2

(12) United States Patent
Farrant

(10) Patent No.: US 12,742,437 B2
(45) Date of Patent: Sep. 22, 2026

(54) MULTIPLE BLADE WIND TURBINE

(71) Applicant: Harvard Mark Farrant, Greater Sudbury (CA)

(72) Inventor: Harvard Mark Farrant, Greater Sudbury (CA)

( * ) Notice: Subject to any disclaimer, the term of this patent is extended or adjusted under 35 U.S.C. 154(b) by 0 days.

(21) Appl. No.: 18/659,743

(22) Filed: May 9, 2024

(65) Prior Publication Data

US 2025/0347265 A1 Nov. 13, 2025

(51) Int. Cl.

*F03D 5/02* (2006.01)
*F03D 3/02* (2006.01)
*F03D 9/25* (2016.01)
*F03D 13/20* (2016.01)

(52) U.S. Cl.

CPC ................ *F03D 5/02* (2013.01); *F03D 9/25* (2016.05); *F03D 13/20* (2016.05); *F03D 3/02* (2013.01); *F05B 2220/706* (2013.01); *F05B 2240/231* (2013.01)

(58) Field of Classification Search

CPC ... F03D 5/02; F03D 9/25; F03D 13/20; F03D 3/02; F05B 2220/706; F05B 2240/231
USPC ..................................................... 290/44, 55
See application file for complete search history.

(56) References Cited

U.S. PATENT DOCUMENTS 1,502,296 A * 7/1924 Doak ........................ F03D 5/02 416/7
4,049,300 A * 9/1977 Schneider ................. F03D 9/22 416/7
6,942,454 B2 * 9/2005 Ohlmann .................. F03D 9/00 290/55
7,075,191 B2 * 7/2006 Davison ................ F03B 17/066 290/43
8,410,622 B1 * 4/2013 Wallach .................... F03D 7/06 290/44

(Continued)

FOREIGN PATENT DOCUMENTS

CN 113323798 A 8/2021
DE 102008046117 A1 3/2010

(Continued)

OTHER PUBLICATIONS

European Search Report mailed Sep. 15, 2025 in related EP 25175429.

*Primary Examiner* — Charles Reid, Jr.
(74) *Attorney, Agent, or Firm* — The Belles Group, P.C.

(57) ABSTRACT

A multiple blade wind turbine includes a base, a central support tower, and at least one rotor. The central support tower extends vertically from the base and is adapted to support the rotor. The rotor includes airfoil-shaped blades and an electric generator coupled to a set of closed loop tracks via a transmission. The set of closed loop tracks is spaced vertically apart from each other. The airfoil-shaped blades are interspaced within the set of closed loop tracks. Each airfoil-shaped blade is oriented perpendicular to the airflow and connected at each end to one of the set of closed loop tracks such that a windward and a leeward set of airfoil-shaped blades are aligned to form a linear cascade of parallel airfoil-shaped blades. Each airfoil-shaped blade has a pitch angle between −90 and 90 degrees and each airfoil-shaped blade is spaced between 1.0 and 2.5 chord lengths apart.

17 Claims, 6 Drawing Sheets

(56) References Cited

U.S. PATENT DOCUMENTS

| | | | | |
|---|---|---|---|---|
| 8,618,682 | B2 * | 12/2013 | Syrovy | F03D 9/25 290/55 |
| 2009/0045634 | A1 * | 2/2009 | Sane | F03D 13/20 290/55 |
| 2010/0001531 | A1 * | 1/2010 | Kulde | F03D 9/25 290/55 |
| 2010/0013238 | A1 * | 1/2010 | Jessie | F03D 3/062 290/55 |
| 2011/0018280 | A1 * | 1/2011 | Mahaffy | F03D 7/06 290/55 |
| 2012/0061972 | A1 * | 3/2012 | Young | F03D 5/04 290/55 |
| 2013/0056990 | A1 * | 3/2013 | Sines | F03D 3/0445 290/55 |
| 2013/0113217 | A1 * | 5/2013 | Vaz | F03D 3/061 290/55 |
| 2014/0077504 | A1 * | 3/2014 | Epstein | F03D 80/70 290/55 |
| 2014/0375060 | A1 * | 12/2014 | Lin | F03D 3/0409 290/55 |
| 2019/0242354 | A1 * | 8/2019 | Schneider | F03B 1/00 |

FOREIGN PATENT DOCUMENTS

| | | | |
|---|---|---|---|
| KR | 101348610 | B1 | 1/2014 |
| NO | 325383 | B1 | 4/2008 |
| WO | 2013109007 | A1 | 7/2013 |

* cited by examiner

MULTIPLE BLADE WIND TURBINE

FIELD OF THE INVENTION

The disclosure generally relates to wind energy technology. More specifically, the invention relates to a multiple blade wind turbine.

BACKGROUND

Wind turbines are an important technology for the generation of electricity using renewable energy resources, i.e. the wind. Their annual percentage increase in kilowatt production is currently greater than any other form of electricity-generating technology.

Presently, the most popular type of large wind turbine, i.e. greater than 25 kW (rated peak power), has a horizontal axis, referred to as a horizontal axis wind turbine (HAWT), and can have one or more high-speed, airfoil-type rotor blades used for generating lift. Wind turbines are either of variable-speed or fixed-speed type.

The kinetic energy of the wind can be expressed as: $KEwind=\frac{1}{2}mV^2=\frac{1}{2}(\rho AtV)V^2=\frac{1}{2}\rho AtV^3$ where m is the mass of air, ρ is the air density, A is the area swept by the wind turbine blades, t is the time, and V is the wind speed. Therefore, the power (i.e. energy/time) of the wind can be expressed as: $POWERwind=\frac{1}{2}\rho AV^3$. As we can see, the wind's power is directly related to the wind speed cubed. For example, when the wind speed doubles, its power is increased by a factor of eight (i.e. $2^3=8$). The power harnessed by a wind turbine is directly related to the power of the wind that passes through the area swept by the wind turbine blades.

Multiple blade wind turbines have already been previously considered. For example, U.S. Pat. No. 8,618,682 describes a looped airfoil wind turbine (LAWT). The LAWT is based on a conveyor-belt arrangement of horizontal airfoils. U.S. Pat. No. 7,075,191 describes a wind and water-power generation device (WWPGD) using a rail system. The WWPGD is based on a conveyor-belt arrangement of vertically-mounted airfoils. U.S. Pat. No. 4,049,300 describes a fluid driven power producing apparatus (FDPPA) and is shown in FIG. 3. The FDPPA is based on a conveyor-belt arrangement of horizontally-mounted airfoils. Although several such multiple blade wind turbines are known in the art, the power output and efficiency of existing wind turbines may be further optimized. Therefore, a multiple blade wind turbine that improves upon the existing technology to provide increased power output and efficiency is desired.

SUMMARY

This summary is provided to introduce a selection of concepts in a simplified format that are further described in the detailed description of the disclosure. This summary is not intended to identify key or essential inventive concepts of the disclosure, nor is it intended for determining the scope of the disclosure.

Disclosed herein is a multiple blade wind turbine including a base, a central support tower extending vertically from the base, and at least one rotor supported by the central support tower. The at least one rotor includes a set of closed loop tracks, a plurality of airfoil-shaped blades, a transmission, and an electric generator connected to the transmission. The set of closed loop tracks are spaced vertically apart from each other and adapted to be engaged to a transmission. The set of closed loop tracks is oval. The plurality of airfoil-shaped blades is interspaced within the set of closed loop tracks. Each airfoil-shaped blade is oriented perpendicular to the airflow and connected at each end to one of the set of closed loop tracks. A windward set of airfoil-shaped blades are aligned to form a linear cascade of parallel airfoil-shaped blades and a leeward set of airfoil-shaped blades are aligned to form a linear cascade of parallel airfoil-shaped blades. The leeward set of airfoil-shaped blades are disposed parallel to the windward set of airfoil-shaped blades and disposed behind the windward set of airfoil-shaped blades relative to the airflow. Each airfoil-shaped blade has a pitch angle between-90 and 90 degrees. Moreover, each airfoil-shaped blade is spaced between 1.0 and 2.5 chord lengths apart. The transmission is mechanically coupled to the set of closed loop tracks such that the set of closed loop tracks drives the transmission. The electric generator is adapted to be connected to the transmission.

In one or more embodiments according to the disclosure, the at least one rotor is adapted to rotate about the central support tower.

In one or more embodiments according to the disclosure, the windward set of airfoil-shaped blades and the leeward set of airfoil-shaped blades are spaced between 2.5 and 6.0 chord lengths apart.

In one or more embodiments according to the disclosure, the ratio of the speed of each airfoil-shaped blade to the speed of the airflow ranges between 0 and 4.0.

In one or more embodiments according to the disclosure, the set of closed loop tracks includes a set of drive belts or a set of drive chains.

In one or more embodiments according to the disclosure, at least one of the transmission, the electric generator, and control circuitry are coupled to a top portion of the central support tower.

In one or more embodiments according to the disclosure, the control circuitry is configured to regulate at least one of the ratio of the speed of each airfoil-shaped blade to the speed of the airflow and the pitch angle of each airfoil-shaped blade.

In one or more embodiments according to the disclosure, the electric generator, the transmission, and the control circuitry is enclosed by a generator housing.

In one or more embodiments according to the disclosure, the transmission comprises one of an adjustable-speed drive, a continuously variable transmission, and a hydraulic transmission.

In one or more embodiments according to the disclosure, the transmission comprises a gearbox, a gearbox axle coupled to the gearbox, and a gear assembly connected to the gearbox axle, such that the gear assembly contains at least two drive sprockets coupled to the set of closed loop tracks and the gearbox is coupled to the electric generator.

In one or more embodiments according to the disclosure, each drive sprocket and each set of closed loop tracks are coupled to the central support tower via a short top support member 109 and a long top support member 108.

In one or more embodiments according to the disclosure, the windward set of airfoil-shaped blades and the leeward set of airfoil-shaped blades are symmetrical in cross-section.

In one or more embodiments according to the disclosure, the windward set of airfoil-shaped blades and the leeward set of airfoil-shaped blades are flexing and asymmetrical in cross-section.

Also disclosed herein is a multiple blade wind turbine including a base, a central support tower extending vertically from the base, and at least two rotors supported by the central support tower. Each rotor is oriented parallel to the central support tower and includes a set of closed loop tracks, a plurality of airfoil-shaped blades, a transmission, and an electric generator connected to the transmission. The set of closed loop tracks are spaced vertically apart from each other and adapted to be engaged to a transmission, such that the set of closed loop tracks is oval. The plurality of airfoil-shaped blades is interspaced within the set of closed loop tracks. Each airfoil-shaped blade is oriented perpendicular to the airflow and connected at each end to one of the set of closed loop tracks such that a windward set of airfoil-shaped blades are disposed proximal to the freestream airflow and a leeward set of airfoil-shaped blades, parallel to the windward set of airfoil-shaped blades, are disposed behind the windward set of airfoil-shaped blades with respect to the wind direction, such that each airfoil-shaped blade has a pitch angle between-90 and 90 degrees and each airfoil-shaped blade is spaced between 1.0 and 2.5 chord lengths apart. The transmission is mechanically coupled to the set of closed loop tracks, such that the set of closed loop tracks drives the transmission. The electric generator is connected to the transmission including one of an adjustable-speed drive, a continuously variable transmission, and a hydraulic transmission. The transmission includes a gearbox, a gearbox axle coupled to the gearbox, and a gear assembly connected to the gearbox axle. The gear assembly contains at least two drive sprockets coupled to the set of closed loop tracks and the gearbox is coupled to the electric generator.

In one or more embodiments according to the disclosure, the windward set of airfoil-shaped blades and the leeward set of airfoil-shaped blades are spaced between 2.5 and 6.0 chord lengths apart.

In one or more embodiments according to the disclosure, the ratio of the speed of each airfoil-shaped blade to the speed of the airflow ranges between 0 and 4.0.

In one or more embodiments according to the disclosure, the set of closed loop tracks includes a set of drive belts or a set of drive chains.

In one or more embodiments according to the disclosure, at least one of the transmission, the electric generator, and control circuitry are coupled to a top portion of the central support tower.

In one or more embodiments according to the disclosure, the electric generator, the transmission, and the control circuitry is enclosed by a generator housing.

In one or more embodiments according to the disclosure, the control circuitry is configured to regulate at least one of the ratio of the speed of each airfoil-shaped blade to the speed of the airflow and the pitch angle of each airfoil-shaped blade.

To further clarify the advantages and features of the method and system, a more particular description of the method and system will be rendered by reference to specific embodiments thereof, which is illustrated in the appended drawing. It is appreciated that these drawings depict only typical embodiments of the disclosure and are therefore not to be considered limiting its scope. The disclosure will be described and explained with additional specificity and detail with the accompanying drawings.

BRIEF DESCRIPTION OF THE DRAWINGS

These and other features, aspects, and advantages will become better understood when the following detailed description is read with reference to the accompanying drawings in which like characters represent like parts throughout the drawings, wherein.

Figure 1A:
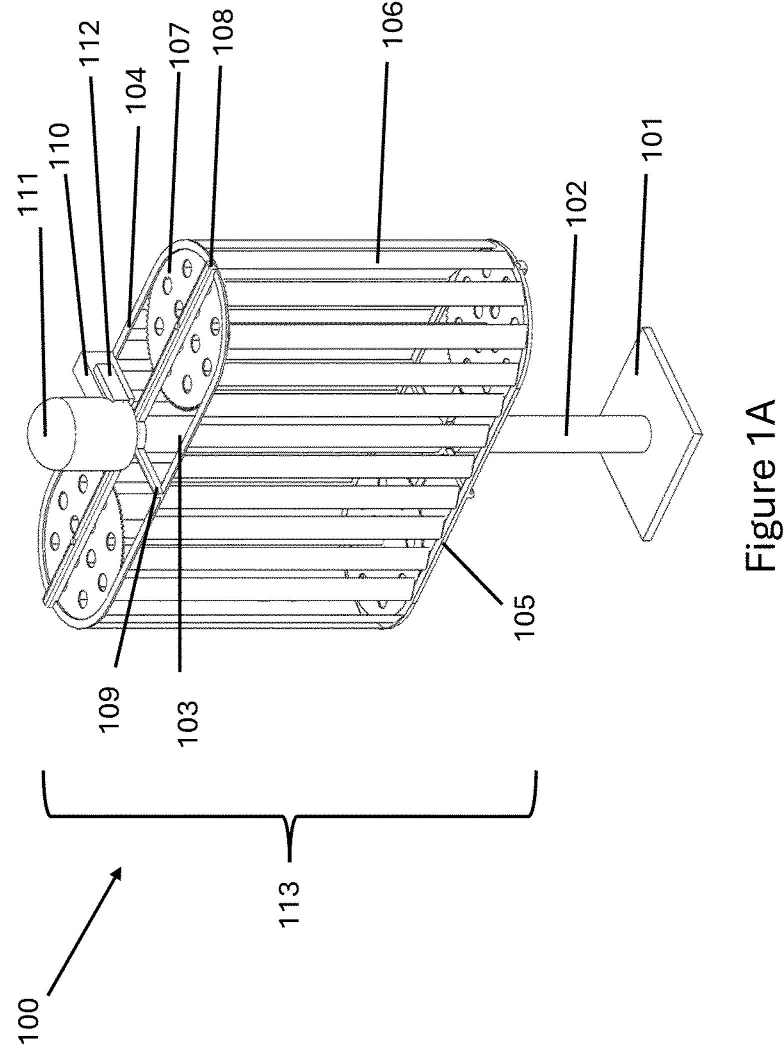
FIG. 1A illustrates a perspective view of a multiple blade wind turbine having a single rotor.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment", "some embodiments", "one or more embodiments" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Embodiments of the disclosure will be described below in detail with reference to the accompanying drawings.

FIG. 1A illustrates a perspective view of a multiple blade wind turbine 100 having a single rotor. The multiple blade wind turbine 100 includes a base 101, a central support tower 102 extending vertically from the base 101, and at least one rotor 113. The central support tower 102 is adapted to support the at least one rotor 113 such that the at least one rotor 113 is adapted to rotate about the central support tower 102. The at least one rotor 113 includes a set of closed loop tracks (104, 105), a plurality of airfoil-shaped blades 106, a transmission 110, and an electric generator 111 connected to the transmission 110. The set of closed loop tracks (104, 105) is spaced vertically apart from each other and adapted to be engaged to a transmission such that each airfoil-shaped blade 106 is vertical and oriented parallel to the central support tower 102. Moreover, the airfoil-shaped blades 106 can be rotated a full 360 degrees relative to the set of closed loop tracks (104, 105).

Since the airfoil-shaped blades 106 of the multiple blade wind turbine 100 are vertical and parallel to the central support tower 102, this feature allows the airfoil-shaped blades 106 to have a high aspect ratio (i.e. blade span/chord length) of 10 or higher. The airfoil-shaped blade 106 with a high aspect ratio reduces the negative impact due to blade tip losses on the overall aerodynamic performance of the airfoil-shaped blade 106. This improves the power generating capability of the airfoil-shaped blade 106 via a higher driving force.

Moreover, the set of closed loop tracks (104, 105) has an oval blade path. The oval blade path greatly reduces the centripetal forces acting on each rotating airfoil-shaped blade 106 as the airfoil-shaped blade 106 changes direction, since the semi-circular arc has a large radius. The smooth transition to the oval blade path eliminates detrimental vibrations that are generated via inertia in the drive chain of the multiple blade wind turbine 100 as each airfoil-shaped blade 106 rapidly changes 180 degrees in direction via a large-radius arc.

In an embodiment, the airfoil-shaped blades 106 are interspaced within the set of closed loop tracks (104, 105). Each airfoil-shaped blade 106 is oriented perpendicular to the airflow and connected at each end to one of the set of closed loop tracks (104, 105) such that a windward set of airfoil-shaped blades 106 are aligned to form a linear cascade of parallel airfoil-shaped blades and a leeward set of airfoil-shaped blades 106 are aligned to form a linear cascade of parallel airfoil-shaped blades 106. The leeward set of airfoil-shaped blades 106 are disposed parallel to the windward set of airfoil-shaped blades 106 and disposed behind the windward set of airfoil-shaped blades 106 relative to the airflow. Moreover, each airfoil-shaped blade 106 has a pitch angle between −90 and 90 degrees.

In an embodiment, each airfoil-shaped blade 106 is spaced between 1.0 and 2.5 chord lengths apart. When the airfoil-shaped blades 106 are properly spaced in accordance with their pitch angle, the separation of the airflow from the low-pressure side of each airfoil-shaped blade 106 is delayed. In effect, two adjacent airfoil-shaped blades 106 can act as a convergent nozzle to channel the airflow more smoothly. This phenomenon increases the lift force of each airfoil-shaped blade 106 and increases the power production of the rotor. Delayed separation can prevent or reduce blade stall, which greatly reduces the lift force of the airfoil-shaped blades 106. Close-spacing of the airfoil-shaped blades 106 increases the air pressure in front of the airfoil-shaped blades 106, which enables a greater drop in air pressure immediately behind the airfoil-shaped blades 106 for additional lift. Moreover, close-spacing of the airfoil-shaped blades 106 increases the air speed between the airfoil-shaped blades 106 (due to the conservation of momentum), which also increases the lift force.

Figure 1B:
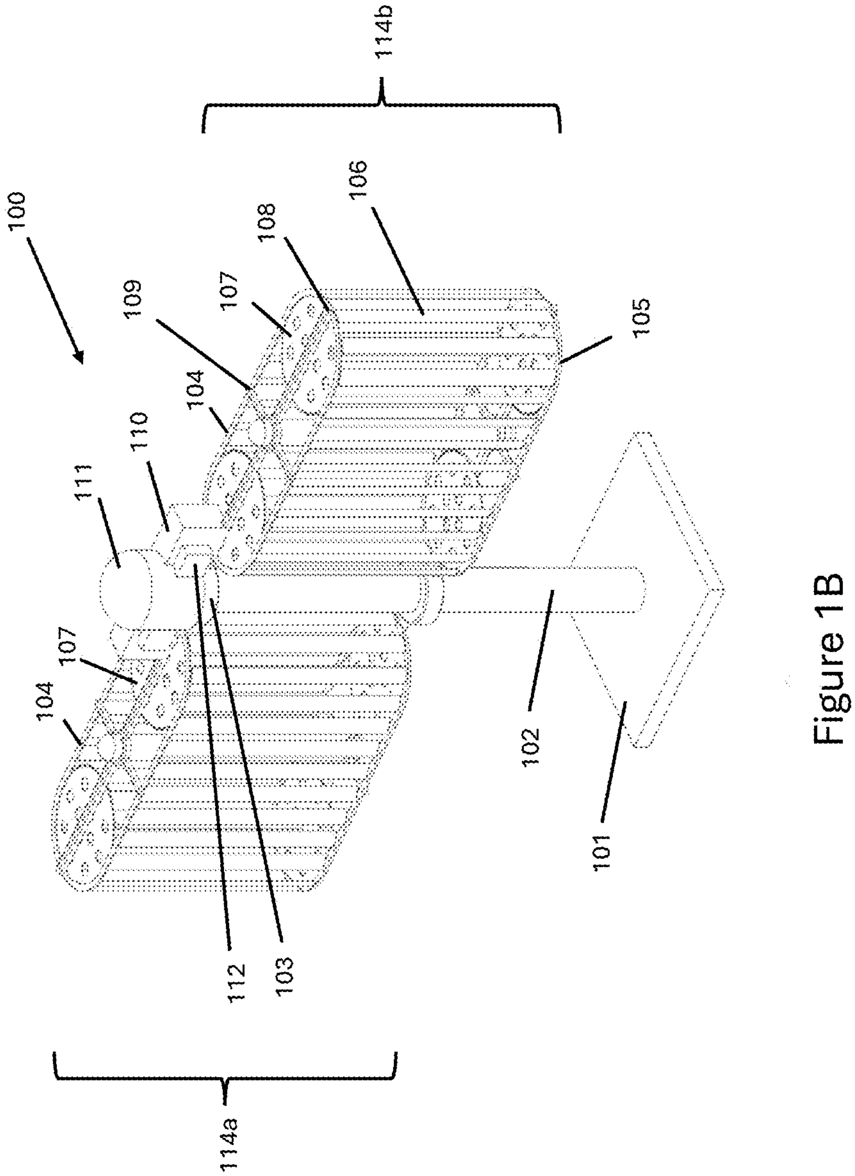
FIG. 1B illustrates a perspective view of the multiple blade wind turbine having a dual rotor.

FIG. 1B illustrates a perspective view of the multiple blade wind turbine 100 having a dual rotor. In an exemplary embodiment, the multiple blade wind turbine 100 includes the central support tower 102 extending vertically from the base 101 and adapted to support at least two rotors 114*a*, 114*b* such that each rotor is oriented parallel to the central support tower 102. Each rotor includes the set of closed loop tracks (104, 105) spaced vertically apart from each other and adapted to be engaged to a transmission 110. Moreover, the set of closed loop tracks (104, 105) has an oval blade path.

The plurality of airfoil-shaped blades 106 is interspaced within the set of closed loop tracks (104, 105). Each airfoil-shaped blade 106 is oriented perpendicular to the airflow and connected at each end to one of the set of closed loop tracks (104, 105) such that a windward set of airfoil-shaped blades 106 are disposed proximal to the freestream airflow and a leeward set of airfoil-shaped blades 106, parallel to the windward set of airfoil-shaped blades 106, are disposed behind the windward set of airfoil-shaped blades 106 with respect to the wind direction.

Preferably, each airfoil-shaped blade 106 has a pitch angle between-90 and 90 degrees and each airfoil-shaped blade 106 is spaced between 1.0 and 2.5 chord lengths apart. Close-spacing of the airfoil-shaped blades 106 increases the air pressure in front of the airfoil-shaped blades 106, which enables a greater drop in air pressure immediately behind the airfoil-shaped blades 106 for additional lift. Moreover, close-spacing of the airfoil-shaped blades 106 increase the air speed between the blades (due to the conservation of momentum), which also increases the lift force.

The transmission includes a gearbox axle coupled to the gearbox and a gear assembly connected to the gearbox axle. The gear assembly contains at least two drive sprockets 107 coupled to the set of closed loop tracks (104, 105) and the gearbox is coupled to the electric generator. In an embodiment, each drive sprocket 107 and each set of closed loop tracks (104, 105) are coupled to the central support tower 102 via a short top support member 109 and a long top support member 108. The transmission is mechanically coupled to the set of closed loop tracks (104, 105), such that the set of closed loop tracks (104, 105) drives the transmission. In an embodiment, the transmission may be a gearbox. The set of closed loop tracks (104, 105) includes a set of drive belts or a set of drive chains 115 adapted to engage the transmission to convert the low-speed rotation of the set of closed loop tracks (104, 105) to the high speed rotation capable of generating electricity. The transmission then engages the electric generator for generating the actual electricity.

In an embodiment, the windward set of airfoil-shaped blades 106 and the leeward set of airfoil-shaped blades 106 are spaced between 2.5 and 6.0 chord lengths apart to optimize the power production of the leeward set of airfoil-shaped blades 106 by allowing the airflow to be redirected by the windward set of airfoil-shaped blades 106 onto the high-performance section of the leeward set of airfoil-shaped blades 106. In an embodiment, the ratio of the speed of each airfoil-shaped blade 106 to the speed of the airflow ranges between 0 and 4.0.

Both the single rotor multiple blade wind turbine 100 and dual rotor multiple blade wind turbine 100, shown in FIGS. 1A-1B, are supported by the central support tower 102. In an embodiment, at least one of the transmission 110, the electric generator 111, and control circuitry 112 are coupled to a top portion 103 of the central support tower 102. The top portion of the central support tower 102 may be coupled to a generator housing adapted to house the electrical generator, gearbox (if used), and control circuitry, much like a nacelle of an existing large 3-blade wind turbine. This location optimizes the transfer of mechanical power to the electrical generator and facilitates the retrofitting of an aging wind turbine rotor with a new single rotor or dual rotor of the multiple blade wind turbine 100. In an embodiment, the control circuitry is configured to regulate the ratio of the speed of each airfoil-shaped blade 106 to the speed of the airflow and/or regulate the pitch angle of each airfoil-shaped blade 106.

As used herein, the term "control circuitry" may refer to one or a combination of microprocessors, suitable logic, circuits, audio interfaces, visual interfaces, haptic interfaces, or the like. The control circuitry may include, but are not limited to a microcontroller, a Reduced Instruction Set Computing (RISC) processor, an Application-Specific Integrated Circuit (ASIC) processor, a Complex Instruction Set Computing (CISC) processor, a central processing unit (CPU), a graphics processing unit (GPU), a state machine, and/or other processing units or circuits. In one or more embodiments, the control circuitry may include a processor, memory, modules, and data. The modules and the memory are coupled to the processor. The processor can be a single processing unit or several units, all of which could include multiple computing units. The processor may be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute computer-readable instructions and data stored in the memory.

The term "control circuitry" may also comprise suitable logic, circuits, interfaces, and/or code that may be configured to execute a set of instructions stored in the memory unit. The memory unit may additionally store several types of information related to the multiple blade wind turbine 100. In an exemplary implementation of the memory unit according to the present disclosure, the memory unit may include, but are not limited to, Electrically Erasable Programmable Read-only Memory (EEPROM), Random Access Memory (RAM), Read Only Memory (ROM), Hard Disk Drive (HDD), Flash memory, Solid-State Drive (SSD), and/or CPU cache memory. The memory may also include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The modules, amongst other things, include routines, programs, objects, components, data structures, etc., which perform tasks or implement data types. The modules may also be implemented as, signal processor(s), state machine (s), logic circuitries, and/or any other device or component that manipulate signals based on operational instructions. Further, the modules can be implemented in hardware, instructions executed by a processing unit, or by a combination thereof. The processing unit can comprise a computer, a processor, such as the processor, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another aspect of the present disclosure, the modules may be machine-readable instructions (software) which, when executed by a processor/processing unit, perform any of the described functionalities.

Figure 2A:
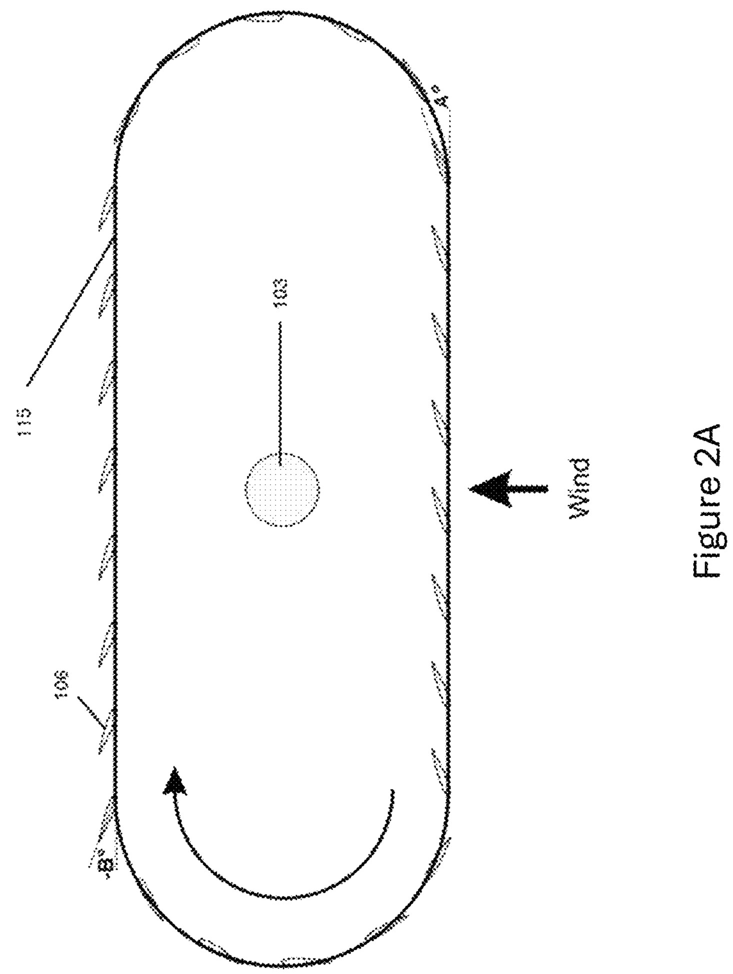
FIG. 2A illustrates a schematic top view of the multiple blade wind turbine using symmetrical airfoil-shaped blades.

FIG. 2A illustrates a schematic top view of the multiple blade wind turbine 100 using symmetrical airfoil-shaped blades 106 moving along the oval blade path around the central support tower 102 (shown in FIG. 1). The windward set of airfoil-shaped blades 106 and the leeward set of airfoil-shaped blades 106 are symmetrical in cross-section. Preferably, the use of the symmetrical airfoil-shaped blade 106, such as the NACA (National Advisory Committee for Aeronautics) 0015 airfoil (or a similar class of airfoils) maximizes the lift for the leeward set of airfoil-shaped blades 106. The pitch of each airfoil-shaped blade 106 can be changed, which is shown as A° for the windward set of airfoil-shaped blades 106 and −B° for the leeward set of airfoil-shaped blades 106. In an embodiment, the pitch of each airfoil-shaped blade 106 may be adjusted by the control circuitry. The windward set of airfoil-shaped blades 106 do not have to have the same pitch angle, neither do the leeward set of airfoil-shaped blades 106. The pitch angle of the airfoil-shaped blades 106 can also be varied as they rotate in a circular trajectory.

Figure 2B:
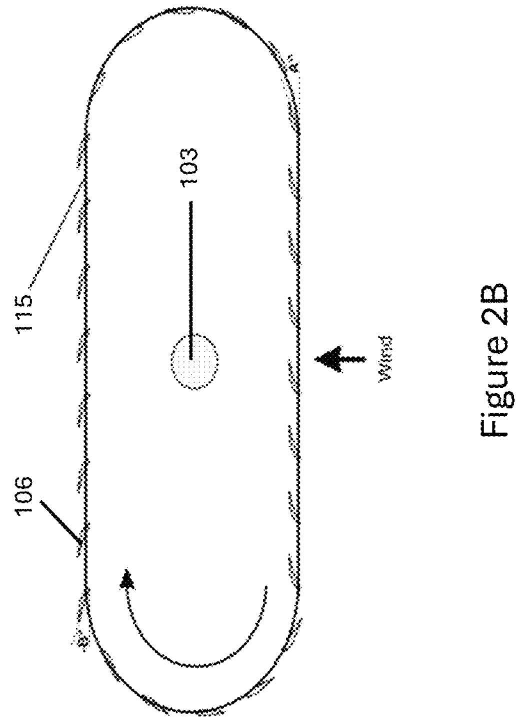
FIG. 2B illustrates a schematic top view of the multiple blade wind turbine using asymmetrical, cambered airfoil-shaped blades.

FIG. 2B illustrates a schematic top view of the multiple blade wind turbine using asymmetrical, cambered airfoil-shaped blades 106 moving along the oval blade path around the central support tower 102 (shown in FIG. 1). In an exemplary embodiment, the windward set of airfoil-shaped blades 106 and the leeward set of airfoil-shaped blades 106 are flexing and asymmetrical in cross-section. Preferably, the asymmetrical, cambered EPPLER 423 airfoil-shaped blades 106 that are flipped, or morphed, so that the leeward set of airfoil-shaped blades 106 are the mirror image (along the longitudinal axis) of the windward set of airfoil-shaped blades 106, as shown in FIG. 2B.

In an embodiment, the pitch of each airfoil-shaped blade 106 can be changed, which is shown as A° for the windward set of airfoil-shaped blades 106 and −B° for the leeward set of airfoil-shaped blades 106. The windward set of airfoil-shaped blades 106 do not have to have the same pitch angle, neither do the leeward set of airfoil-shaped blades 106. The pitch angle of the airfoil-shaped blades 106 can also be varied as they rotate in a circular trajectory. To maximize power output, the asymmetric airfoil-shaped blades 106 must be flipped so that each leeward airfoil-shaped blade 106 forms a mirror image (along its longitudinal axis) of a corresponding windward airfoil-shaped blade 106. Flipping the leeward set of airfoil-shaped blades 106 significantly increases the power generated by these airfoil-shaped blades 106 and generates more power than a rotor with symmetrical airfoil-shaped blades 106. This dynamic "morphing" mechanism allows the rotor with asymmetrical airfoil-shaped blades 106 to generate more power than the rotor with symmetrical airfoil-shaped blades 106. FIGS. 2A-2B show the blade pitches for a given set of airfoil-shaped blades 106 to be the same. However, this does not have to be the case. Ideally, the blade pitch can be controlled separately for each airfoil-shaped blade 106 to optimize the power production of the rotor.

Figure 3A:
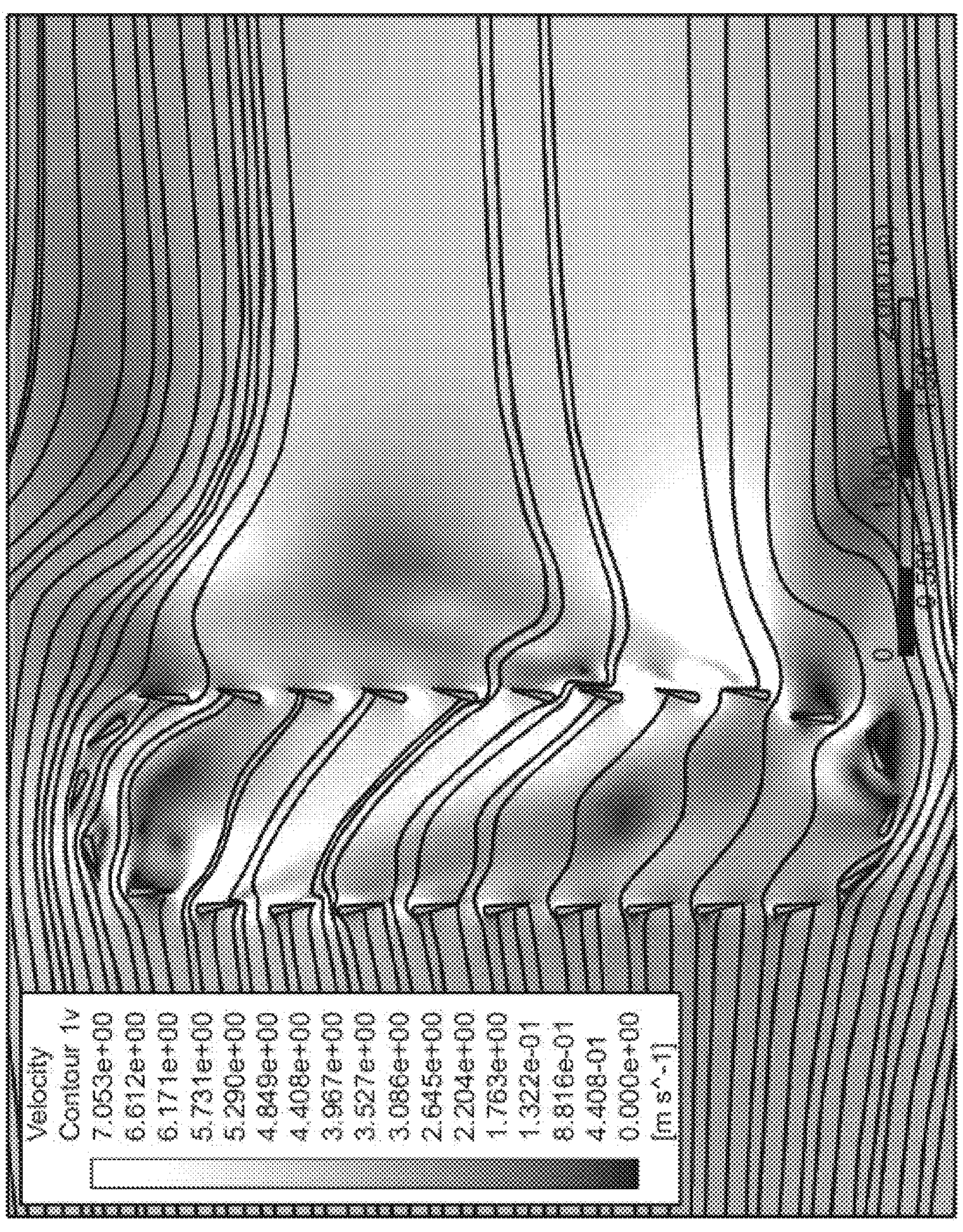
FIG. 3A illustrates a top view of the velocity contours and streamlines for a rotor of the multiple blade wind turbine.

FIG. 3A illustrates a top view of the velocity contours and streamlines for a rotor of the multiple blade wind turbine 100. The spacing between the windward and leeward cascaded blades is critical to maximizing the rotor's power generation. FIG. 3A shows a spacing of 4.8 chord lengths between the windward set of airfoil-shaped blades 106 and the leeward set of airfoil-shaped blades 106. Empirically determined spacing optimizes the power production of the leeward set of airfoil-shaped blades 106 by allowing the airflow to be redirected by the windward set of airfoil-shaped blades 106 onto the high-performance section of the leeward set of airfoil-shaped blades 106. The ideal spacing range is between 2.5 and 6.0 chord lengths.

Figure 3B:
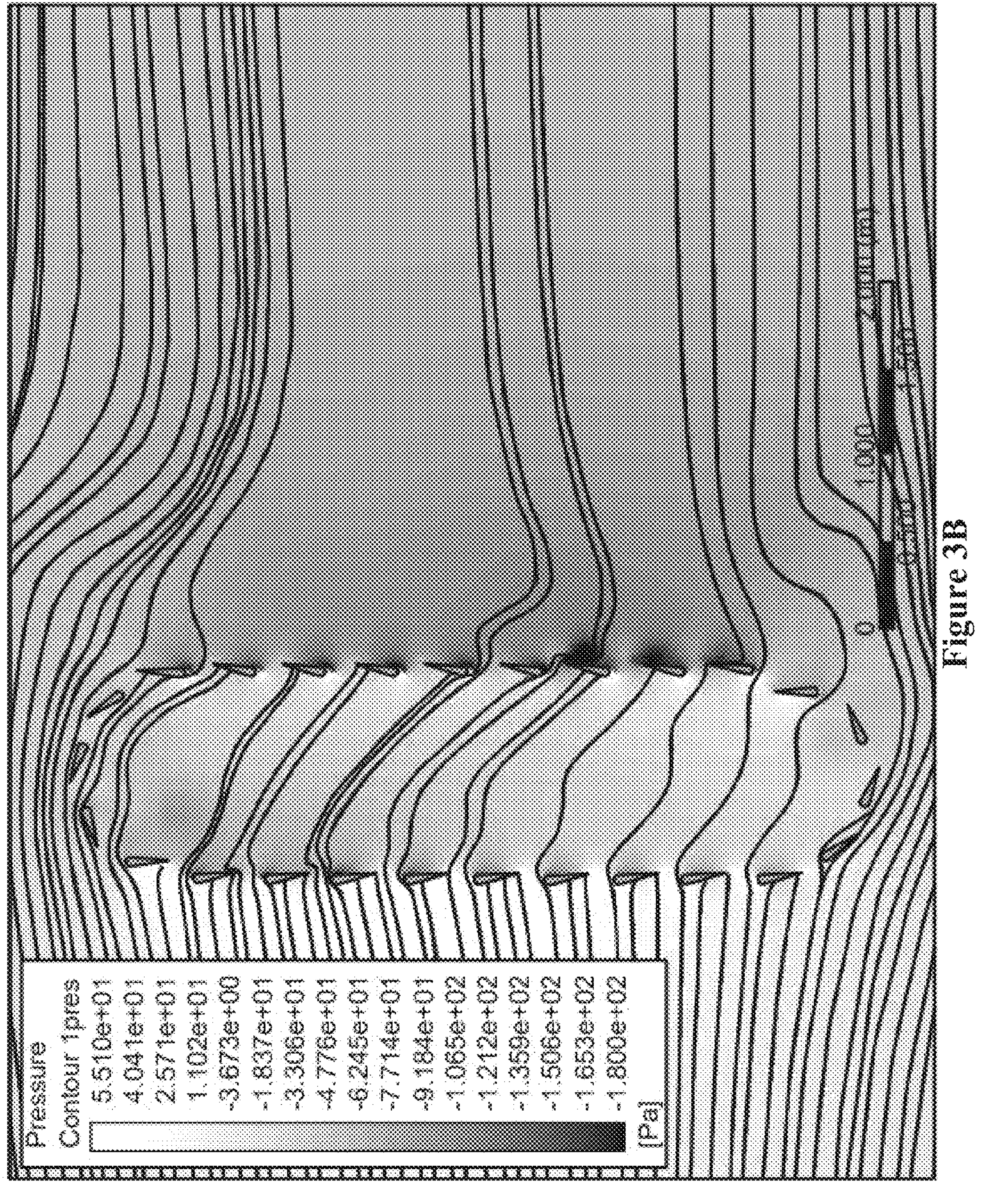
FIG. 3B illustrates a top view of the pressure contours and streamlines for the rotor of the multiple blade wind turbine.

FIG. 3B illustrates a top view of the pressure contours and streamlines for the rotor of the multiple blade wind turbine 100. Proper spacing between the airfoil-shaped blades 106 generates a high-pressure gradient in front of the windward set of airfoil-shaped blades 106. This spacing varies from 1.1 to 2.5 chord lengths and is affected by the blade pitch. A smaller blade pitch with respect to the wind direction requires closer blade spacing to create an effective high-pressure gradient. The high-pressure gradient improves power production in two ways. Firstly, the high-pressure gradient concentrates the highest air pressure in front of the high-performance section of the airfoil-shaped blades 106. These leading airfoil-shaped blades 106 (top left) produce substantially more power than the trailing blades (bottom left) in the cascade.

Secondly, the high-pressure gradient functions as an airflow buffer that moderates the air speed immediately in front of the windward set of airfoil-shaped blades 106. This buffer zone reduces the mechanical stress and wear on the airfoil-shaped blades 106 during wind gusts, or in high wind speeds. The buffer zone also stabilizes the airflow between the airfoil-shaped blades 106, which optimizes lift. In effect, proper blade spacing creates a measurable synergy between the airfoil-shaped blades 106 to maximize power production. In an embodiment, the air speed may be 5 meter per second (m/s) and a rotor speed may be 15 m/s, without departing from the scope of the present disclosure.

The multiple blade wind turbine 100, disclosed herein, is a crossflow wind turbine. Therefore, both the windward and the leeward set of airfoil-shaped blades 106 can generate mechanical power. In fact, computational fluid dynamic studies, shown in FIGS. 3A-3B, indicate that the windward set of airfoil-shaped blades 106 can funnel and concentrate the airflow onto the leeward set of airfoil-shaped blades 106 such that the leeward set of airfoil-shaped blades 106 can generate more power than the windward set of airfoil-shaped blades 106. This is atypical aerodynamic behavior for a crossflow wind turbine.

For the rotor of the multiple blade wind turbine 100 the air stream is accelerated as the air stream flows around the windward set of airfoil-shaped blades. As a result, the leeward set of airfoil-shaped blades 106 with properly pitched airfoil-shaped blades 106 can generate the same amount of power, or even more power, as the windward set of airfoil-shaped blades 106. The power generated by all airfoil-shaped blades 106 is cumulative. Therefore, each cascaded airfoil-shaped blade 106 can contribute to the overall power generated. The airfoil-shaped blades 106, while rotating 180 degrees, can also generate some additional power when pitched properly. However, most of the power generated by the rotor is due to the aerodynamic behavior of the cascaded airfoil-shaped blades 106.

The multiple blade wind turbine 100, disclosed herein, has a much higher power density, since the multiple blade wind turbine 100 has a maximum power coefficient (Cp) that can exceed the Betz limit and exceed unity (i.e. Cp>1). Therefore, to generate the same amount of power the multiple blade wind turbine 100, disclosed herein, requires a much smaller swept area. For example, if the average multiple blade wind turbine 100, Cp is 1.8 and the Cp of an existing wind turbine is 0.45, the swept area of the multiple blade wind turbine 100 would be (0.45/1.8)=¼ the area of the existing wind turbine for the same power generation. This significant feature reduces the manufacturing, installation, and maintenance costs of the rotor.

Moreover, the multiple blade wind turbine 100, disclosed herein has a higher power density that allows the multiple blade wind turbine 100 to produce cost-effective power in areas with low average wind speeds (i.e. IEC Wind Class IV, or even lower wind speeds). For example, comparing an existing wind turbine (average Cp=0.45) and the multiple blade wind turbine 100 (average Cp=2.08) with the same swept areas, the annual power generated by the existing wind turbine at a site with IEC Wind Class I wind speeds (i.e. Average annual wind speed=10 m/s) is the same as the annual power generated by the multiple blade wind turbine 100 at a site with IEC Wind Class IV wind speeds (i.e. Average annual wind speed=6 m/s). Therefore, the multiple blade wind turbine 100 can be cost-effectively installed at many more potential wind turbine sites.

The multiple blade wind turbine 100 has a high rotor solidity (i.e. 2=blade area/swept area) and a relatively low blade speed ratio (e.g., BSR<=4), which greatly reduces the risk of injury to flying birds and bats. Advantageously, the low blade speed also reduces the noise generated by the moving airfoil-shaped blades 106. This feature allows the multiple blade wind turbine 100 to be installed in urban areas and lowers the risk of noise-based nimbyism.

Advantageously, the multiple blade wind turbine 100 has vertical airfoil-shaped blades 106 that are supported at both ends, which reduces their strength requirements. Moreover, the multiple blade wind turbine 100 has straight, constant-chord length airfoil-shaped blades 106 that are easy and relatively inexpensive to manufacture (e.g., via extrusion, etc.).

The multiple blade wind turbine 100 may also have asymmetrical airfoil-shaped blades 106 with adjustable shapes, so that each airfoil-shaped blade 106 can be flipped (i.e. changed to the mirror-imaged shape along the longitudinal axis) while moving to significantly increase total power production. Furthermore, the multiple blade wind turbine 100 uses airfoil-shaped blades 106 with variable dynamic pitching to optimize power production.

Advantageously, the multiple blade wind turbine 100 has vertical airfoil-shaped blades 106 that can have a high aspect ratio (e.g. 10 or greater, where aspect ratio=blade span/chord length) due to the height of the central support tower 102 of the multiple blade wind turbine 100. The inclusion of the airfoil-shaped blades 106 having high aspect ratios increases the maximum power coefficient of the rotor, since the overall aerodynamic effect of the blade tip losses are reduced.

Advantageously, the multiple blade wind turbine 100 has the windward set of airfoil-shaped blades 106 and the leeward set of airfoil-shaped blades 106 that can both generate significant power when the airfoil-shaped blades 106 are pitched properly.

As would be apparent to a person in the art, various working modifications may be made to the method in order to implement the inventive concept as taught herein.

Moreover, the actions of any flow diagram need not be implemented in the order shown; nor do all the acts necessarily need to be performed. Also, those acts that are not dependent on other acts may be performed in parallel with the other acts.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Benefits, other advantages, and solutions to problems have been described above regarding specific embodiments. However, the benefits, advantages, solutions to problems, and any component(s) that may cause any benefit, advantage, or solution to occur or become more pronounced are not to be construed as a critical, or essential feature or component of any or all the claims.

What is claimed is:

1. A multiple blade wind turbine comprising:

a base;

a central support tower extending vertically from the base and adapted to support at least one rotor, the at least one rotor comprising:

a set of closed loop tracks spaced vertically apart from each other and adapted to be engaged to a transmission, wherein the set of closed loop tracks is oval;

a plurality of airfoil-shaped blades interspaced within the set of closed loop tracks, each airfoil-shaped blade oriented perpendicular to the airflow and connected at each end to one of the set of closed loop tracks such that a windward set of airfoil-shaped blades are aligned to form a linear cascade of parallel airfoil-shaped blades and a leeward set of airfoil-shaped blades are aligned to form a linear cascade of parallel airfoil-shaped blades, the leeward set of airfoil-shaped blades disposed parallel to the windward set of airfoil-shaped blades, and disposed behind the windward set of airfoil-shaped blades relative to the airflow, wherein, each airfoil-shaped blade has a pitch angle between −90 and 90 degrees, each airfoil-shaped blade is spaced between 1.0 and 2.5 chord lengths apart;

the transmission mechanically coupled to the set of closed loop tracks, wherein the set of closed loop tracks drives the transmission; and an electric generator connected to the transmission.

2. The multiple blade wind turbine of claim 1, wherein the at least one rotor is adapted to rotate about the central support tower.

3. The multiple blade wind turbine of claim 1, wherein the windward set of airfoil-shaped blades and the leeward set of airfoil-shaped blades are spaced between 2.5 and 6.0 chord lengths apart.

4. The multiple blade wind turbine of claim 1, wherein the ratio of the speed of each airfoil-shaped blade to the speed of the airflow ranges between 0 and 4.0.

5. The multiple blade wind turbine of claim 1, wherein the set of closed loop tracks comprises a set of drive belts or a set of drive chains.

6. The multiple blade wind turbine of claim 1, wherein at least one of the transmission, the electric generator, and control circuitry are coupled to a top portion of the central support tower.

7. The multiple blade wind turbine according to claim 1, wherein the control circuitry is configured to regulate at least one of:

the ratio of the speed of each airfoil-shaped blade to the speed of the airflow; and the pitch angle of each airfoil-shaped blade.

8. The multiple blade wind turbine of claim 1, wherein the windward set of airfoil-shaped blades and the leeward set of airfoil-shaped blades are symmetrical in cross-section.

9. The multiple blade wind turbine of claim 1, wherein the windward set of airfoil-shaped blades and the leeward set of airfoil-shaped blades are flexing and asymmetrical in cross-section.

10. A multiple blade wind turbine comprising:

a base;

a central support tower extending vertically from the base and adapted to support at least two rotors such that each rotor is oriented parallel to the central support tower, each rotor comprising:

a set of closed loop tracks spaced vertically apart from each other and adapted to be engaged to a transmission, wherein the set of closed loop tracks is oval;

a plurality of airfoil-shaped blades interspaced within the set of closed loop tracks, each airfoil-shaped blade oriented perpendicular to the airflow and connected at each end to one of the set of closed loop tracks such that a windward set of airfoil-shaped blades are disposed proximal to a freestream airflow and a leeward set of airfoil-shaped blades, parallel to the windward set of airfoil-shaped blades, are disposed behind the windward set of airfoil-shaped blades with respect to the wind direction, wherein, each airfoil-shaped blade has a pitch angle between −90 and 90 degrees, each airfoil-shaped blade is spaced between 1.0 and 2.5 chord lengths apart;

the transmission mechanically coupled to the set of closed loop tracks, wherein the set of closed loop tracks drives the transmission; and an electric generator connected to the transmission.

11. The multiple blade wind turbine of claim 10, wherein the windward set of airfoil-shaped blades and the leeward set of airfoil-shaped blades are spaced between 2.5 and 6.0 chord lengths apart.

12. The multiple blade wind turbine of claim 10, wherein the ratio of the speed of each airfoil-shaped blade to the speed of the airflow ranges between 0 and 4.0.

13. The multiple blade wind turbine of claim 10, wherein the set of closed loop tracks comprises a set of drive belts or a set of drive chains.

14. The multiple blade wind turbine of claim 10, wherein at least one of the transmission, the electric generator, and control circuitry are coupled to a top portion of the central support tower.

15. The multiple blade wind turbine of claim 10, wherein the control circuitry is configured to regulate at least one of:

the ratio of the speed of each airfoil-shaped blade to the speed of the airflow; and the pitch angle of each airfoil-shaped blade.

16. The multiple blade wind turbine of claim 10, wherein the windward set of airfoil-shaped blades and the leeward set of airfoil-shaped blades are symmetrical in cross-section.

17. The multiple blade wind turbine of claim 10, wherein the windward set of airfoil-shaped blades and the leeward set of airfoil-shaped blades are flexing and asymmetrical in cross-section.

* * * * *